Figure 2:
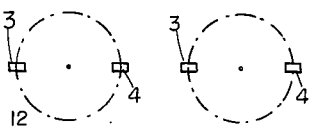

March 6, 1962  A. WEHNER  3,023,904
SCREEN FOR USE IN OSCILLATING SCREENING DEVICES
Original Filed March 15, 1954  2 Sheets-Sheet 1

Albert Wehner
INVENTOR.

BY

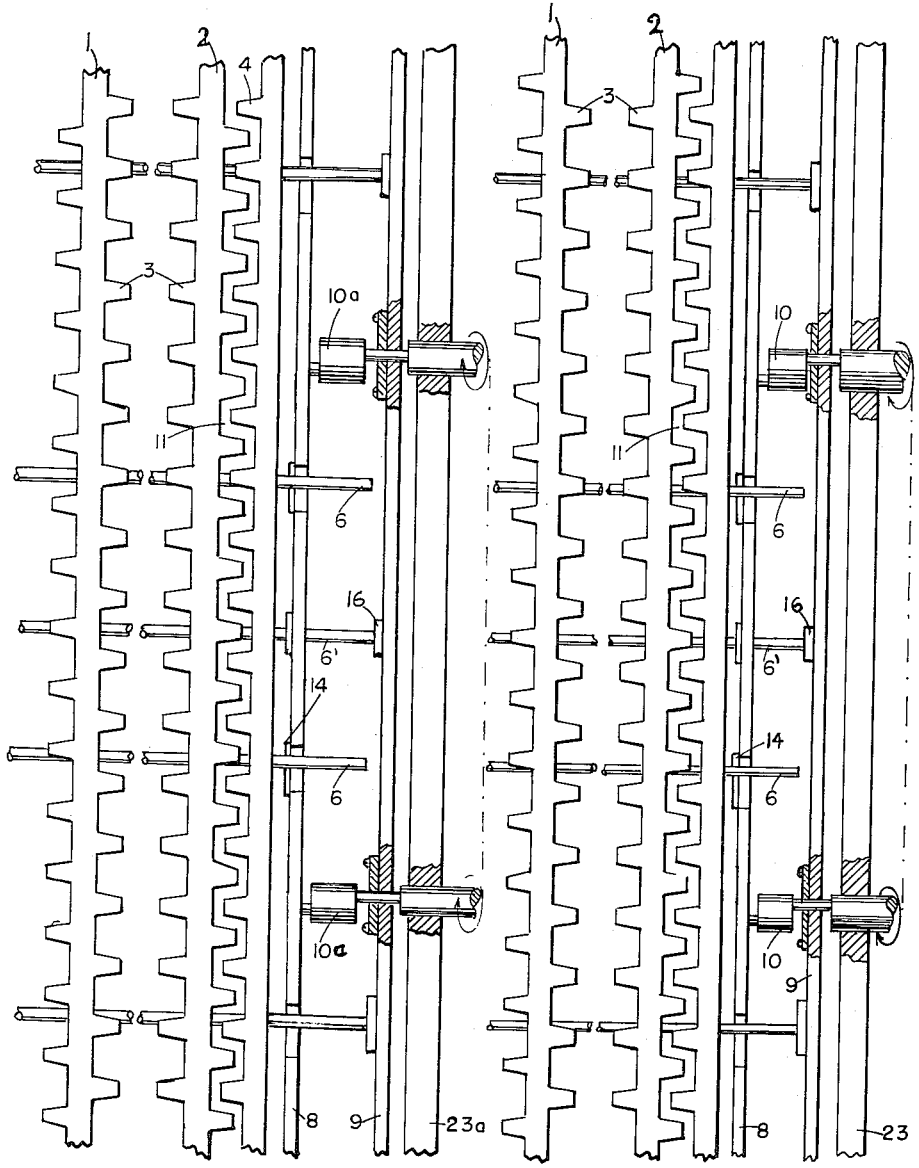

3,023,904
SCREEN FOR USE IN OSCILLATING
SCREENING DEVICES
Albert Wehner, Neuss (Rhine), Germany, assignor to Brueckenbau Flender G.m.b.H., Dusseldorf, Germany, a limited liability company
Original application Mar. 15, 1954, Ser. No. 416,318. Divided and this application Oct. 20, 1958, Ser. No. 772,646
1 Claim. (Cl. 209—396)

This application is a division of application Serial No. 416,318, now Patent No. 2,870,910.

The invention relates to oscillating screens and sieves; it particularly relates to oscillating screens and sieves provided with adjacently spaced bars formed preferably on both sides, with lateral projections.

It is an important object of the invention to impart to screens and sieves of the above-mentioned type a high grade of self-cleaning efficiency.

It is a further object of the invention to create a very large screening surface and to improve the screen openings in such a manner that a satisfactory grain classification of the materials to be screened is attained even in those cases where these materials are interspersed with rod-shaped pieces, such as wood fibers.

The customary screens and sieves do not satisfy the above-mentioned objects. Even if, for instance, perforated sheet-metal screens have certain advantages with regard to durability, simplicity of construction and shape retention of their openings and perforations, they possess the disadvantage of having a restricted open screen surface and, above all, they are rigid and therefore not self-cleaning.

The situation with known fabric screens is different. Here the shape of the screen openings is changeable to a certain extent and the open screen surface is relatively large; on the other hand, their self-cleaning ability, their resistance to wear and the loading capacity of these fabric screens is insufficient.

The known perforated screens consisting of adjacent profiled bars have the disadvantage of a poor classification of the charged materials and, in particular, cannot be used to screen rod-shaped materials.

Screens are known which consist of profiled rods provided with short lateral extensions, the latter being oppositely located to each other and acting as distance pieces. Such screens, however, are extremely stiff and rigid; moreover, stoppages, which considerably interfere with the output of the screen, are the rule with these screens.

It is thus another object of this invention to eliminate the above-recited disadvantages and drawbacks of conventional screen types.

With this purpose in view, bar-shaped screen members are used in conformity with this invention and the same are provided with transverse or lateral extensions which are disposed in such a manner that the lateral projections of one screen member are received between the cross bars of the adjacent screen members; the screen members are alternatingly mounted in two relatively movable frame members which are located on oscillating links, rods, springs or the like and connected in such a manner that they move parallel to one another during their oscillation. The system has been disclosed, but not claimed, in U.S. Patent No. 2,870,910 issued on a formerly co-pending application.

These screen members may be used in the form of profiled bars and the two frame-forming members may be mounted and driven by suitably arranged crank shafts in such a manner that the lateral projections of two adjacent profile bars and therefore of different frames are movable about a common axis of rotation, or that the lateral extensions of the one frame move around those of the other frame.

Figure 3:
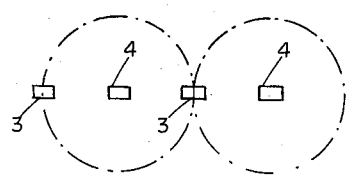
Figure 1:
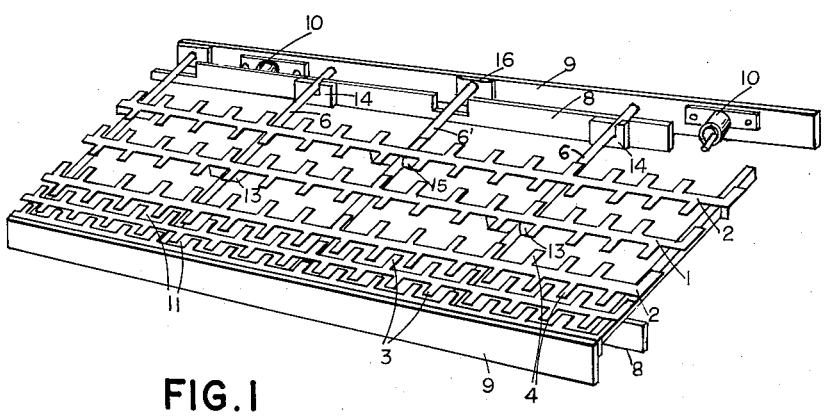

The invention will now be described more in detail and with reference to the accompanying drawing, wherein:

FIG. 1 is a perspective view of a screen according to the invention composed of oscillating screen sections;

FIGS. 2 and 3 are diagrammatic views illustrating various modes of oscillating the screen shown in FIG. 1; and FIGS. 4 and 5 are fragmentary top-plan views (parts broken away) of the screen of FIG. 1 mounted for oscillatory movement in keeping with FIGS. 2 and 3, respectively.

As is apparent from FIG. 1 the screen has two frame members 8, 9 and its longitudinal bars 1, 2 are respectively connected to these outer frame members 8, 9 by rails 6, 6' which are either welded to the bars 1, 2 or otherwise connected therewith.

The two movable frame members or bars 8, 9 are connected with each other by oscillating means, such as the crank shafts 10 (FIG. 4) or 10a (FIG. 5), in such a manner that the interstices 11 enclosed by the adjacent longitudinal bars 1, 2 and their lateral extensions 3, 4 are periodically changed with regard to size and shape. In this manner a highly desirable self-cleaning action is attained, and work interruption due to clogging of the screen passages is prevented.

The two frame bars 8, 9 may be mounted and driven in such a manner that the interengaging lateral extensions 3, 4 carry out the movements diagrammatically illustrated in FIGS. 2 and 3.

By the application of suitable driving means to the crank shafts 10 or 10a, as schematically illustrated in dot-dash lines in FIGS. 4 and 5, the lateral extensions 3 may make circular movements about their position of rest or about the stationary lateral extensions 4, as shown in FIG. 3.

Thus, the frame members 8, 9 with the sets of profiled bars 1, 2 respectively carried thereon may be mounted, as illustrated in FIG. 4, on a support 23 in which the crank shafts 10 are journaled eccentrically so that both frames 8 and 9 execute translational movements causing the extensions 3, 4 to revolve about common axes 12 as shown in FIG. 2. They may, however, also have crank shafts 10a journaled in a support 23a concentrically with respect to frame 9, as shown in FIG. 5, whereby the extensions 3 revolve about the extensions 4 as illustrated in FIG. 3.

From FIGS. 1, 4 and 5 it will be apparent that the rails 6 pass freely underneath bars 2 while being secured to bars 1 at 13 and to frame 8 at 14; conversely, rails 6' pass freely underneath bars 1 while being connected with bars 2 at 15 and with frame 9 at 16.

Since certain changes may be made in the above invention and different embodiments of the same could be made without departing from the scope thereof, it is intended that all matter contained in the above description or shown in the accompanying drawing shall be interpreted as illustrative and not in a limiting sense.

What I claim is:

A screen for use in oscillating screening devices, comprising a first and a second set of longitudinal profiled bars spacedly located next to and alternating with one another, said profiled bars being provided with lateral extensions which are positioned in intermeshed relationship with each other, and crank-shaft means for so displacing said sets relative to each other while maintaining said profiled bars parallel to one another that the extensions on each of said bars of one set rotate around the lateral extensions of the adjacent bars of the other set.

References Cited in the file of this patent

UNITED STATES PATENTS

| | | |
|---|---|---|
| 1,553,693 | Jensen et al. | Sept. 15, 1925 |
| 1,876,034 | Symons | Sept. 6, 1932 |